Patented Oct. 30, 1945

2,388,160

UNITED STATES PATENT OFFICE 2,388,160

PROCESS OF SEPARATING ETHYLENE POLYMERS

Norman William Krase, Swarthmore, Pa., assignor to E. I. du Pont de Nemours & Company, Wilmington, Del., a corporation of Delaware No Drawing. Application December 9, 1942, Serial No. 468,419

6 Claims. (Cl. 260—94)

This invention relates to the separation of high molecular weight products and more particularly to the separation of products from a mixture of high molecular weight compounds obtained by the treatment of ethylene in the presence of oxygen type and similar catalysts.

It is known that monoolefinic hydrocarbons and more patricularly ethylene can be converted into products having a linear polymeric structure and, likewise, that solid and semi-solid products of high molecular weight can be produoed by subjecting these hydrocarbons to polymerization pressures ranging between 500 and 3000 atmospheres and at temperatures between 40° and 400° C. in the presence of molecular oxygen or compounds which give up oxygen, or the process may be conducted at the higher pressures in the substantial absence of added catalyst. When the polymerization is conducted in the presence of molecular oxygen, or under conditions that give similar results, products are obtained which constitute a mixture of many individual compounds. These individual compounds have widely different chemical and physical properties, and are herein referred to as high pressure peroxygen-catalyzed olefine or ethylene products.

An object of the present invention is to provide an improved process for the separation of the high pressure oxygen catalyzed olefine products into products having uniform properties. Another object of the invention is to provide a means of separating such products into fractions in which the molecular weights of the constituents present are relatively of the same order of magnitude. Yet another object of the invention is to provide a process for the precipitation of such products and especially the high pressure peroxygen-catalyzed ethylene products from solution in hydrocarbon vapors or in ethylene by differential pressure or differential temperature fractionation. Still another object is to provide a means of separation by a combination of differential pressure and differential temperature stages. Other objects and advantages of the invention will hereinafter appear.

In the preparation of high molecular products from the monoolefinic hydrocarbons and especially ethylene the reaction is, as has been stated, generally catalyzed by peroxygen-type catalysts at extremely elevated pressures and at these pressures a large amount of the products is dissolved in the vapors. In accord with this invention, it has been found that products having different physical and chemical properties can be obtained by lowering the pressure under substantially constant temperatures by a series of stages and collecting the products which precipitate from each stage. By this method it is possible to obtain high molecular weight products from ethylene, that vary in physical characteristics from hard horny solid masses to waxy semi-solid masses, while intermediate products between the extreme limiting products are obtainable varying in properties in accord with the number of pressure stages used in separating them.

Similarly, it has been found that, in lieu of dropping the pressure in stages, effective fractionation can be realized by dropping the temperature in stages while maintaining the pressure substantially constant, and it has been found that each one of the individual fractions has physical and chemical properties different from the properties of the fractions obtained at higher or lower temperatures. A modification of the aforesaid procedures may also be effected by changing both temperature and pressure at each stage. By these expedients, which involve utilizing differential pressure, differential temperature, or a combination of both differential temperature and pressure, it is possible, in accord with the invention, to separate a valuable series of products from the high pressure polymerized olefine products.

The invention is adapted to the treatment of the polymers, interpolymers or other high molecular weight products of whatever nature prepared from ethylene per se, or from ethylene or other polymerizable monoolefinic hydrocarbons, under high pressure and catalyzed by peroxygen-type catalysts or catalyzed by no catalysts under very high pressures. Such olefines may be reacted under such conditions with the following compounds, such as for example, the other olefines, propylene, butylene, isobutylene; dichlorethylene, 2-chloro-propene-1, tetrafluorethylene; vinyl ethers, ketones, esters and other vinyl compounds such as methyl, ethyl and propyl vinyl ethers, vinyl chloracetate, vinyl chloride, vinyl acetate, vinyl propionate, N-vinylphthalimide, vinyl thiolacetate, methyl vinyl thioether, methyl vinyl sulphone, N-vinylcarbazole, vinyl sulphonic esters; styrene; stilbene; acrylic and methacrylic amides, nitriles, esters and other acrylic and methacrylic compounds, e. g. methylene diacrylate and dimethacrylate, ethyl, propyl, butyl and amyl acrylates and methacrylates; alpha-haloacrylic acids and their esters, e. g., methyl alpha-chloroacrylate; esters of crotonic and itaconic acids, e. g., methyl crotonate and diethyl itaconate; butadiene, isoprene, chloro-2-butadiene-1,3; terpenes, e. g., limonene and camphene. The high molecular weight polymers obtained from ethylene with saturated organic acids, esters, anhydrides, aldehydes, alcohols, ethers, halogenated aliphatic hydrocarbons, etc.; acyl halides, sulphonyl halides, sulfur halides, and alkyl sulfates may likewise be fractionated in accord with the process of the invention.

The peroxygen-type catalyst which may be employed in the aforesaid reactions includes molecular oxygen or air which may be present with respect to the olefine in amounts ranging from 5 to 2000 ppm. (calculated as oxygen). While oxygen is the preferred catalyst other peroxygen-type catalysts may be used alone or with oxygen and these catalysts include diethyl peroxide, hydrogen peroxide, persuccinic acid, lauroyl peroxide, tetralin peroxide, urea peroxide, butyryl peroxide, benzoyl peroxide, alkali metal and alkaline earth metal and ammonium persulfates, perborates, percarbonates, and the like.

The following examples will illustrate embodiments of the invention wherein parts are by weight unless otherwise stated.

*Example 1.*—The product made from the polymerization of ethylene containing an initial concentration of from 40 to 200 parts of oxygen per million parts of ethylene in a $\frac{3}{8}$" tubular converter operating at about 200° C. and about 2000 atmospheres or by other suitable processes such as are described in U. S. Pat. 2,153,553, can be fractionated in the following manner. The insoluble polymer, if any, is first separated from that dissolved in ethylene vapor by the use of a separator operating at conversion temperature or above and at conversion pressure. The vapors carrying dissolved polymer are then cooled at constant pressure by passing through one or more traps maintained at successively lower temperatures before letting down the pressure of the vapors to atmospheric pressure.

Following this procedure the undissolved product is separated at conversion pressure and temperature. The resulting vapors freed from a part of their polymer content are then condensed in a second separator to a lower temperature at substantially the conversion pressures. The table given below indicates a number of fractionations of this nature together with the melt viscosity, tensile strength, determined at cold draw and at break and the percent elongation of the fractionated product.

An aluminum cylinder of $\frac{5}{8}$" internal diameter open at the top and fitted at the bottom by an 8 mm. steel disk containing at its center a 2.1 mm. orifice. The cylinder and disk are heated to a temperature of 190° C. and the product to be tested introduced. Above the surface of the product a piston heated to 190° C. and $1\frac{1}{4}$" in diameter is superimposed and upon it a weight is placed giving a combined weight of 2.16 kilo. The weight of product flowing from the orifice in grams per ten minutes is the measure of the melt viscosity.

*Example 2.*—Polymers are made in accord with the process of Example 1. Any undissolved products are separated as described while the dissolved polymer is fractionated at constant temperature by a reduction in pressure taking advantage of the marked reduction in solubility with decreasing pressure. This procedure was followed and the insoluble material obtained, at converter temperature and pressure, separated. The polymer dissolved in the ethylene was then separated by dropping the pressure of the gases containing the dissolved polymers to atmospheric pressure; under these conditions a dissolved polymer of superior physical properties was obtained. The runs which follow indicate the characteristics of the products fractionated in this manner.

| Run | Synthesis | | Fractionation pres.- atms. | Melt visc. | Tensile strength at— | | Percent elongation |
|---|---|---|---|---|---|---|---|
| | Pressure atms. | Temp., °C. | | | Cold draw | Break | |
| $A_1$ | 1,000 | 195 | 1,000 | 0.06 | 1,230 | 1,775 | 580 |
| $A_2$ | 1,000 | 195 | 1 | 0.08 | 1,280 | 2,090 | 660 |
| $B_1$ | 1,000 | 198 | 1,000 | 0.02 | | 1,610 | 360 |
| $B_2$ | 1,000 | 198 | 1 | 20.0 | 1,100 | 1,130 | 125 |
| $C_1$ | 1,000 | 200 | 1,000 | 0.01 | 1,200 | 1,810 | 425 |
| $C_2$ | 1,000 | 200 | 1 | 1.0 | 1,050 | 1,100 | 250 |
| $D_1$ | 1,000 | 208 | 1,000 | 0.002 | 1,650 | 1,950 | 288 |
| $D_2$ | 1,000 | 208 | 1 | 0.04 | 1,360 | 2,090 | 510 |

| Run | Synthesis | | Fractionation temp.,°C. | Melt visc. | Tensile strength at— | | Percent elongation |
|---|---|---|---|---|---|---|---|
| | Pressure atms. | Temp., °C. | | | Cold draw | Break | |
| $A_1$ | 1,000 | 204 | 191 | 0.1 | 1,260 | 1,760 | 525 |
| $A_2$ | 1,000 | 204 | 125 | 2.0 | 1,415 | 1,415 | 120 |
| $B_1$ | 1,000 | 200 | 191 | 0.01 | 1,230 | 1,795 | 480 |
| $B_2$ | 1,000 | 200 | 125 | 0.1 | 1,290 | 1,960 | 600 |
| $C_1$ | 1,000 | 200 | 186 | 0.1 | 1,000 | 1,300 | 470 |
| $C_2$ | 1,000 | 200 | 94 | 0.3 | 1,190 | 2,020 | 640 |
| $D_1$ | 1,000 | 200 | 190 | 0.03 | 1,080 | 1,630 | 510 |
| $D_2$ | 1,000 | 200 | 104 | 0.3 | 1,135 | 1,430 | 550 |
| $E_1$ | 1,000 | 200 | 191 | 0.04 | 1,060 | 1,480 | 480 |
| $E_2$ | 1,000 | 200 | 106 | 0.05 | 1,100 | 1,430 | 470 |

The melt viscosity is the measure of the weight rate of extrusion of molten polymer at 190° C. under a constant load, the measurement being made in an instrument having the following specifications:

I claim:
1. In the fractionation of solid polymers of ethylene obtained by the polymerization of ethylene at a temperature of approximately 200° C. and a pressure of approximately 1000 atmospheres in the presence of oxygen as the catalyst, the step which comprises condensing out the polymer from solution in the ethylene at 1000 atmospheres and 200° C., lowering the temperature to 125° C. while maintaining the pressure at 1000 atmospheres, and separating the polymer condensed out at that temperature.

2. In the separation of solid polymers of ethylene from their solution in a vapor at superatmospheric pressure, the step which comprises fractionating the products by condensation under at least two separate stages, in one stage effecting the separation of polymers of ethylene under substantially the temperature and pressure at which they are prepared and in another stage separating a polymer having physical and chemical characteristics differing from the polymers separated in the first stage, the solubility of the polymers being lower in the latter stage due to temperature and pressure differing from the temperature and pressure of the first stage.

3. In the separation of solid polymers of ethylene from their solution in a vapor at superatmospheric pressure, the step which comprises fractionating the products by condensation under at least two separate stages, in one stage separating polymers of ethylene under a temperature between 40 and 400° C. and a pressure between 500 and 3000 atmospheres and in another stage separating a polymer having physical and chemical characteristics differing from the polymers of the first stage, the solubility of the polymers being lower in the latter stage due to temperature and pressure differing from the temperature and pressure of the first stage.

4. In the separation of solid polymers of ethylene from their solution in a vapor at superatmospheric pressure, the step which comprises fractionating the products by condensation under at least two separate stages by changing the solubility of the polymer in the vapor of each stage due to a change in pressure and temperature from that used in the preceding stage, in one stage separating polymers of ethylene under a temperature between 40 and 400° C. and a pressure between 500 and 3000 atmospheres and in another stage separating a polymer having physical and chemical characteristics differing from the polymers of the first stage, the solubility of the polymers being lower in the second stage, due to a lower pressure than is used in the first stage.

5. In the separation of solid polymers of ethylene from solution in ethylene vapors at superatmospheric pressure, the step which comprises fractionating the ethylene polymers by condensation from solution in ethylene vapor under at least two separate stages, in one stage effecting the separation of polymers of ethylene under substantially the temperature and pressure at which they are prepared and in another stage, separating a polymer having physical and chemical characteristics differing from the polymers separated in the first stage, the solubility of the polymers being lower in the latter stage due to its temperature and pressure differing from the temperature and pressure of the first stage.

6. In the separation of solid polymers of ethylene from solution in ethylene vapor at superatmospheric pressure, the step which comprises fractionating the polymers of ethylene by condensation under at least two separate stages, in one stage separating polymers of ethylene from ethylene vapors under a temperature between 40 and 400° C. and pressure between 500 and 3000 atmospheres and in another stage separating from the ethylene vapor a polymer having physical and chemical characteristics differing from the polymer of the first stage, the solubility of the polymers being lower in the latter stage due to temperature and pressure differing from the temperature and pressure of the first stage.

NORMAN WILLIAM KRASE.